(12) United States Patent
Chng et al.

(10) Patent No.: US 7,616,118 B2
(45) Date of Patent: Nov. 10, 2009

(54) THEFT-DETERRENT MECHANISM AND METHOD AND RETAIL PACKAGING EMPLOYED THE SAME

(75) Inventors: Weng Wah Chng, 33 Ford Avenue, Singapore (SG) 268713; Kok Chuan Lim, Singapore (SG)

(73) Assignee: Weng Wah Chng, Singapore (SG)

(*) Notice: Subject to any disclaimer, the term of this patent is extended or adjusted under 35 U.S.C. 154(b) by 563 days.

(21) Appl. No.: 11/419,758

(22) Filed: May 23, 2006

(65) Prior Publication Data
US 2007/0268111 A1 Nov. 22, 2007

(30) Foreign Application Priority Data
May 11, 2006 (SG) ................................ 200603234

(51) Int. Cl.
*G08B 13/14* (2006.01)
(52) U.S. Cl. .................. 340/572.1; 340/571; 340/572.8

(58) Field of Classification Search .............. 340/568.1, 340/571, 572.1, 572.8; 705/29
See application file for complete search history.

(56) References Cited

U.S. PATENT DOCUMENTS

2005/0133593 A1  6/2005 Estakhri et al.
2005/0240498 A1* 10/2005 Thaler .......................... 705/29

FOREIGN PATENT DOCUMENTS

WO   WO2006/047582 A2   5/2006

* cited by examiner

*Primary Examiner*—Davetta W Goins
*Assistant Examiner*—Samuel J Walk
(74) *Attorney, Agent, or Firm*—Lawrence Y D Ho & Associates PTE. Ltd.

(57) ABSTRACT

The present invention provides a theft-deterrent mechanism and method that minimizes or eliminates the loss of electronic devices during transportation and sales due to theft, and a retail packaging that comprises the theft-mechanism.

19 Claims, 4 Drawing Sheets

THEFT-DETERRENT MECHANISM AND METHOD AND RETAIL PACKAGING EMPLOYED THE SAME

FIELD OF THE INVENTION

The present invention generally relates to mechanisms and methods for minimizing or eliminating the loss of electronic devices due to theft incurring in transportation and sales, and more particularly to a theft-deterrent mechanism and method that utilizes the I/O port of any electronic devices to minimizing or eliminating the theft of electronic devices, and furthermore to retail packaging of electronic devices that comprises the theft-deterrent mechanism.

BACKGROUND OF THE INVENTION

Theft including shoplifting causes substantial loss for retailers. This problem is magnified when the sale items are high priced and miniature electronic products because their sizes are so small that they can be easily pocketed without notice. There are many attempts of developing mechanisms and apparatuses to deter theft.

The conventional ways of deterring theft include placing products within extra large packaging or placing electronic RFID tags within the package. However, these conventional approaches do not totally remove this concern as the products can still be removed from the packaging and stolen. As for high value but physically small products such as electronic devices, they are often kept under counter or packaged with a packaging sealing that becomes difficult and hazardous to open. However, these approaches are not customer-friendly, resulting in decrease of sales.

Another method of deterring theft is activating a product at the point of sale (POS) at the checkout cashier. For example, pre-paid magnetic telephone calling cards are useless until they are validated at the POS. Hence these cards can be left hanging off a rack with simple, lower security packaging, with no fear of loss, since they cannot be used unless activated by the cashier at the POS. However, the activation process is not done at the checkout cashier, instead it requires the reader at the checkout cashier to send the information to a centralized processor; when the card number matches with any entry of the centralized database, it will allow the user to use the card by entering the card number.

US 2005/0240498 A1 discloses a verification and activation module that may be used for theft deterrence. The verification and activation module is removably coupled with a product having control circuits. Apparently, this dedicated verification and activation module may be suitable for large items; it is not suitable for small items such as miniature electronic devices.

Therefore, there is a need for a simple and effective mechanism and method for theft-deterrence.

SUMMARY OF THE INVENTION

One embodiment of the present invention provides a theft-deterrent mechanism for minimizing or eliminating the loss of electronic devices due to theft, wherein the electronic devices comprises at least one input-output (I/O) connection. The theft-deterrent mechanism comprises a printed circuit board (PCB) with a first set of and a second set of terminals; wherein the first set of the terminals are electronically coupled with the leads of the at least one I/O connection of an electronic device; wherein the electronic device has at least one locking code accessible via the at least I/O connection; and wherein the second set of the terminals can be electronically coupled with a reader that can de-lock the at least one locking code; thereby the electronic device has to be activated by the reader before use. In another embodiment of the theft-deterrent mechanism, the electronic devices are flash memory cards, CF form factor ATA hard drive, USB flash memory drives, MP3 players, or the like. In yet another embodiment of the theft-deterrent mechanism, the first set of terminals is flexible to accommodate all I/O connections. In still another embodiment of the theft-deterrent mechanism, the at least one locking code is pre-stored within the electronic device during manufacturing process. In yet still another embodiment of the theft-deterrent mechanism, the at least locking code is input into the electronic device by the I/O connection via the first set of terminals of the PCB. In another embodiment of the theft-deterrent mechanism, the reader is installed at the sales counters so that the electronic devices can be activated at the point of sale (POS).

Another embodiment of the present invention provides a retail package of an electronic device with a theft-deterrent mechanism, comprising: an electronic device comprising an input-output (I/O) connection; a theft-deterrent mechanism for minimizing or eliminating the loss of electronic devices due to theft; said theft-deterrent mechanism comprising: a printed circuit board (PCB) with a first set of and a second set of terminals; wherein the first set of the terminals are electronically coupled with the leads of the at least one I/O connection of an electronic device; wherein the electronic device has at least one locking code accessible via the at least I/O connection; and wherein the second set of the terminals can be electronically coupled with a reader that can de-lock the at least one locking code; thereby the electronic device has to be activated by the reader before use; and a packaging for encasing the electronic device and the theft-deterrent mechanism but leaving the second set of terminals of the PCB outside of the packaging so that the second set of terminals can be accessed by the reader without opening the packaging.

In another embodiment of the retail package, the electronic devices are flash memory cards, multimedia card, reduced size multimedia, compact plash, CF form factor ATA hard drive, USB flash memory drives, MP3 players, or the like. In yet another embodiment of the retail package, the first set of terminals is flexible to accommodate all I/O connections. In yet another embodiment of the retail package, the at least one locking code is pre-stored within the electronic device during manufacturing process. In still another embodiment of the retail package, the at least locking code is input into the electronic device by the I/O connection via the first set of terminals of the PCB. In yet another embodiment of the retail package, the reader is installed at the sales counters so that the electronic devices can be activated at the point of sale (POS). In still another embodiment of the retail package, the packaging is made of materials selected from a group consisting of: plastics, papers, and metal sheets.

Another embodiment of the present invention provides a method for minimizing and eliminating the loss of electronic devices due to theft, wherein the electronic devices have at least one input-output (I/O) connection, said method comprising: de-activating the electronic devices by providing at least one locking code to the electronic devices so that the electronic devices cannot be used without activation; and activating the electronic devices by de-locking the at least one locking code within the electronic devices via the I/O connections; wherein the activating step employs a printed circuit board (PCB) with a first set of and a second set of terminals; wherein the first set of the terminals are electronically coupled with the leads of the at least one I/O connection of an electronic device; and wherein the second set of the terminals can be electronically coupled with a reader that can de-lock the at least one locking code.

These and additional objectives and advantages of the invention will become apparent from the following detailed description of preferred embodiments thereof in connection with the accompanying drawings.

BRIEF DESCRIPTION OF THE DRAWINGS

Preferred embodiments according to the present invention will now be described with reference to the Figures, in which like reference numerals denote like elements.

DETAILED DESCRIPTION OF THE INVENTION

The present invention may be understood more readily by reference to the following detailed description of certain embodiments of the invention.

Throughout this application, where publications are referenced, the disclosures of these publications are hereby incorporated by reference, in their entireties, into this application in order to more fully describe the state of art to which this invention pertains.

The present invention will be described in detail with reference to the drawings. While specific examples and configurations are described for the illustration of the present invention, they are by no means to be intended to limit the present invention to the specific examples and configurations. In addition, in order not to obscure the principles of the present invention, many known features will not be described in detail.

The present invention provides a theft-deterrent mechanism, a theft-deterrent package, and a theft-deterrent method that are applicable to any electronic devices with at least one input-output connection. The theft-deterrent mechanism is to functionally disable a high value electronic product which has input-output (I/O) ports, and these include memory cards, USB flash memory (thumb) drives, MP3 players, mobile phones and credit card size hard disk drives. The principles of the present invention will be illustrated with a reference to a blister package that is widely used in packaging electronic devices, especially the miniature ones. It is to be noted that the application of the present invention is not restricted by any specific packages.

Figures 1A, 1B:
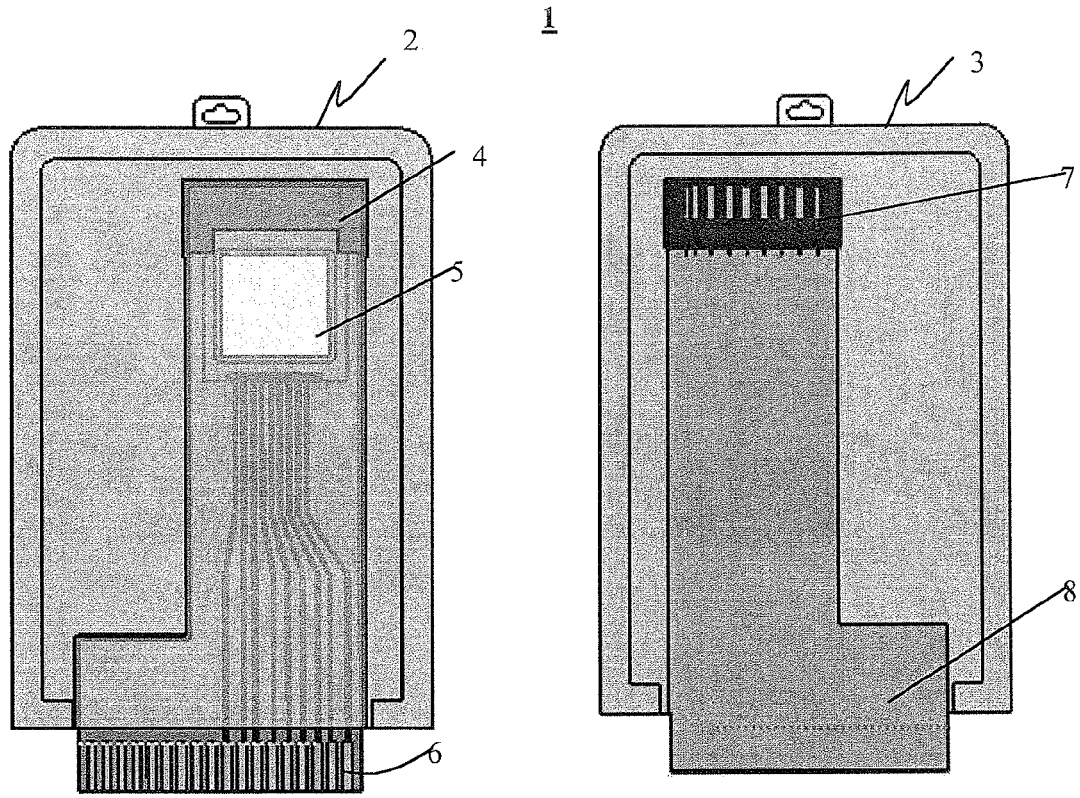
FIG. 1A is a plan view of one half of a blister package with a PCB connector in accordance with one embodiment of the present invention.
FIG. 1B is a plan view of another half of a blister package with a PCT connector backing in accordance with one embodiment of the present invention.

Now referring to FIG. 1A and FIG. 1B, there is provided a blister package with a theft-deterrent mechanism in accordance with one embodiment of the present invention. The blister package 1 comprises an external packaging shell with a first half 2 and a second half 3, where the two halves form an internal cavity/chamber when they are enclosed. Within the internal cavity/chamber are disposed with the electronic device, a print circuit board (PCB) connector, and other packaging materials including paper backing and user's instructions. As shown in FIG. 1A, the PCB connector 5 comprises a first set of connectors 4 and a second set of connectors 6, where the first set of connectors 4 is electronically coupled with the terminals of the I/O connection of the packaged electronic device, and the second set of connectors 6 is accessible by a computer-assisted reader. It is preferable that the second set of connectors 6 is not sealed within the blister package so that they are easily accessible by an external reader. As shown in FIG. 1B, the PCB connector is glued to a cardboard (not numbered), where the cardboard has two portions 7, 8 to enforce the connectors.

Figure 2:
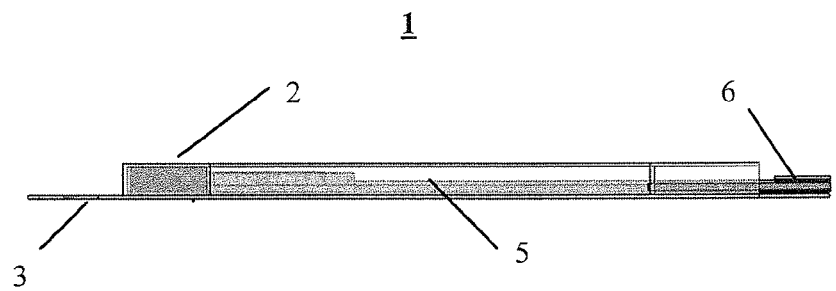
FIG. 2 is a cross-sectional view of a blister package with a PCB connector in accordance with one embodiment of present invention.
Figure 3:
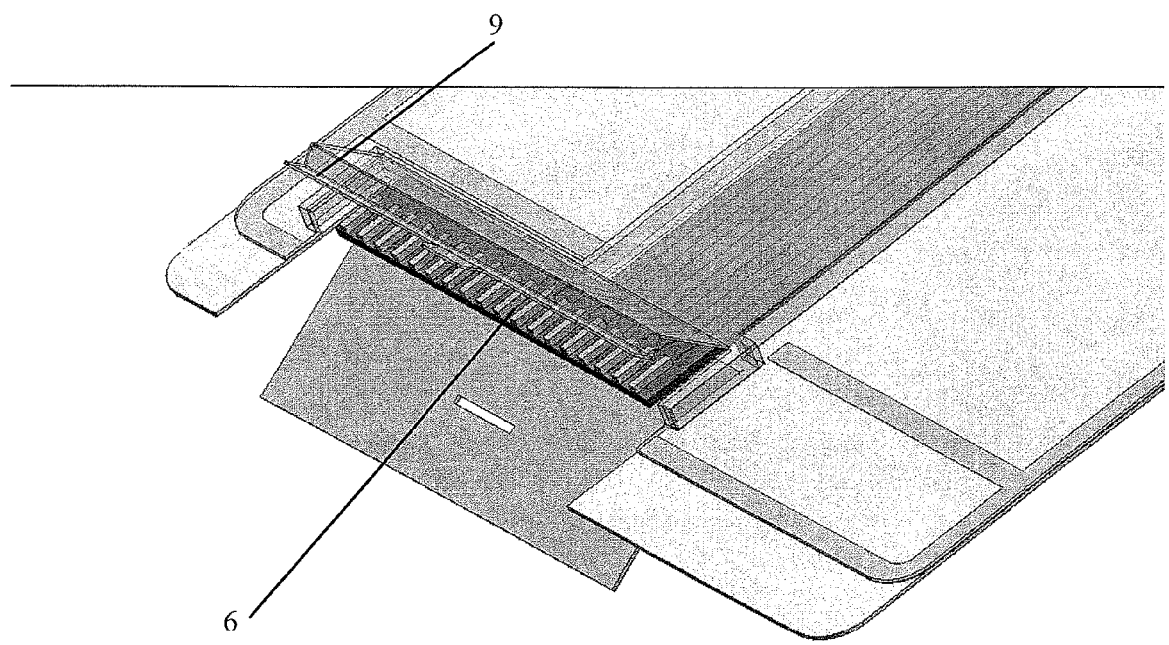
FIG. 3 shows a close-up view of the accessible connectors of the PCB connector in accordance with one embodiment of present invention.

FIG. 2 shows a cross sectional view of a blister package with a PCB connector in accordance with one embodiment of the present invention. It clearly shows that the second set of connectors 6 are exposed externally of the package. FIG. 3 shows a specific design of a theft-deterrent package with the second set of connectors 6 are easily exposed by lifting up the cover 9.

The theft-deterrent package of the present invention allows the packaged electronic devices to be connected to one set of connectors of a PCB connector within the sealed packaging and at the same time provides another set of connectors of the PCB connector that are external to the sealed portion, thus allowing it to be plugged in to a special card reader; the packaged electronic devices can be re-activated without breaking the sealed package.

Figure 4:
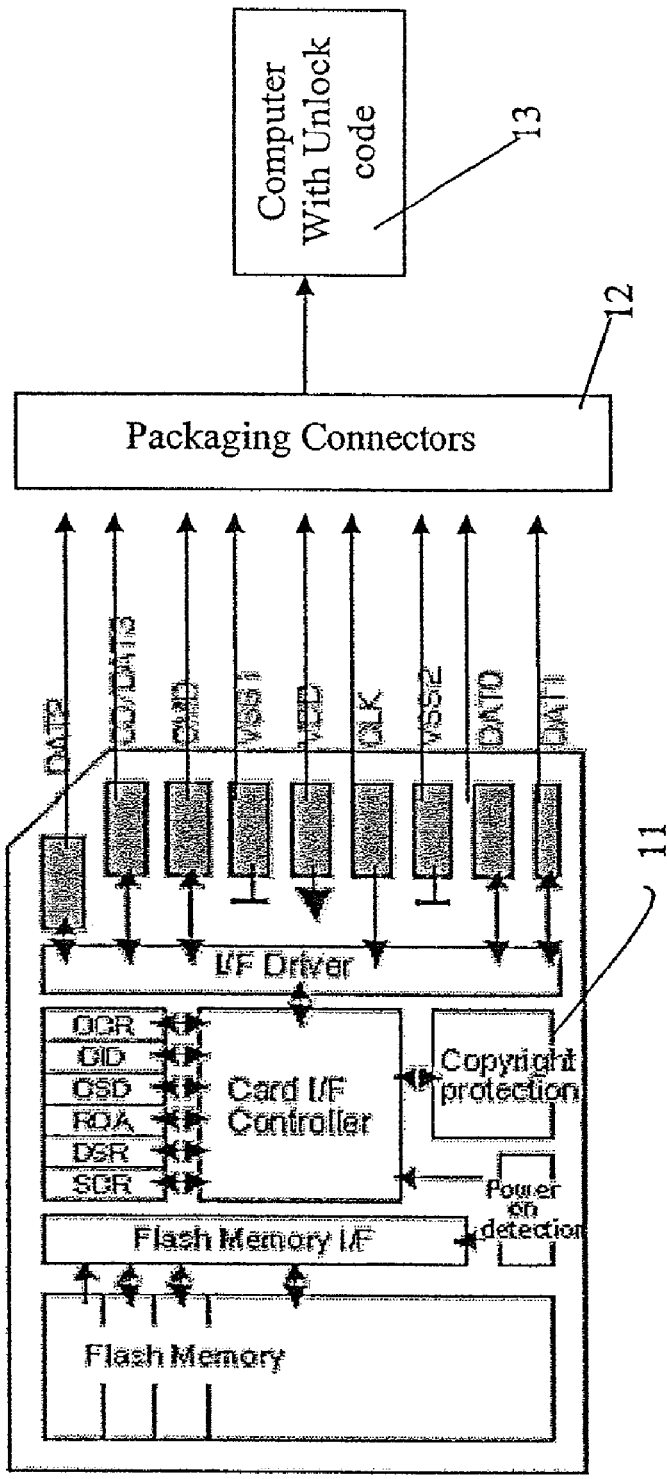
FIG. 4 is a functional diagram illustrating the principles of using a packaging PCB connector in packaging a memory card in accordance with one embodiment of the present invention.
Figure 5:
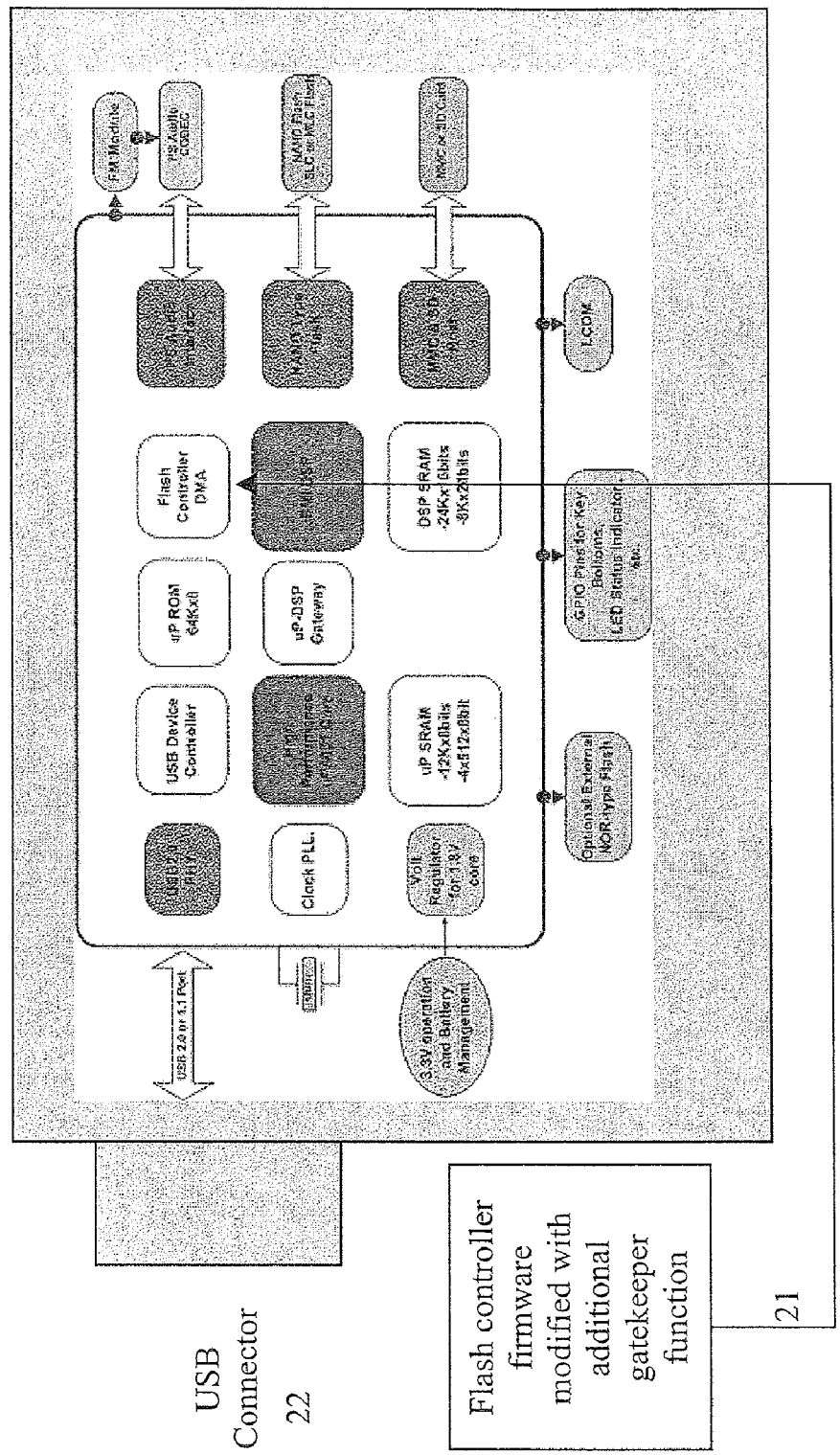
FIG. 5 is a functional diagram illustrating the application of the present invention to MP3 player.

The principles of the present invention are further illustrated by FIG. 4 and FIG. 5. In the case of the SD memory card 11 as shown in FIG. 4, the SD card's internal card interface controller portion has its firmware modified so that it has a gatekeeper function; that is, it will at the manufacturing process have a code being inserted so that the inserted code will lock out the normal functioning of the card. The card is packaged with a packaging connector 12 (e.g., PCB connectors). At the point of sale end, the memory card, while still in the packaging, will be connected to a computer 13 that is equipped with the unlock code installed, and once unlocked, the memory card will function normally. Similarly in the case of a USB flash memory drive or flash memory MP3 player shown in FIG. 5, the firmware in the flash memory Direct memory Access controller 21 is also modified to have a gatekeeper function in the manufacturing process, and the MP3 player becomes locked and unusable unless the correct code is inputted. Similarly it will be unlocked via the USB connector 22 at the point of sale to then function normally.

The types of products this packaging can cover includes flash memory cards of various formats viz—Secure Digital (SD), Mini Secure Digital (Mini-SD), Smartmedia (SM), Memory Stick (MS) and variants; Multimedia Card (MMC), Reduced Size Multimedia (RS-MMC); Compact Plash I & II (CF); CF form factor ATA Hard Drive (Microdrive), USB flash memory drives, MP3 players and other miniature electronic products with an input-output (I/O) connection.

Although the example shown is a thermo-formed clear plastic (blister pack) packaging, this invention is not limited to this form factor. It is possible to apply the same technique to a cardboard box with a pull-out tab that contains the connector.

The connector may be provided with more contacts than is needed for accessing the memory card, USB flash memory device or other interfaceable device. For example, an extra 6 contact points may be provided to identify the product type, whether it be a memory card, flash drive, or some other device, up to a maximum of $2^6$ or 64 types of devices.

Now there is provided a brief description of the theft-deterrent method in accordance with one embodiment of the present invention. The theft-deterrent method can be used for minimizing and eliminating the loss of electronic devices due to theft, wherein the electronic devices have at least one input-output (I/O) connection. More specifically, the method comprises de-activating the electronic devices by providing at least one locking code to the electronic devices so that the electronic devices cannot be used without activation; and activating the electronic devices by de-locking the at least one locking code within the electronic devices via the I/O connections; wherein the activating step employs a printed circuit board (PCB) with a first set of and a second set of terminals; wherein the first set of the terminals are electronically coupled with the leads of the at least one I/O connection of an electronic device; and wherein the second set of the terminals can be electronically coupled with a reader that can de-lock the at least one locking code.

While the present invention has been described with reference to particular embodiments, it will be understood that the embodiments are illustrative and that the scopes of the appended claims are not so limited. Alternative embodiments of the present invention have been set forth by implication and will be apparent to those having ordinary skill in the art to which the present invention pertains. Such alternate embodiments are considered to be encompassed within the scope of one or more of the appended claims. Accordingly, the scope of the present invention is described by the appended claims and is supported by the foregoing description.

What is claimed is:

1. A theft-deterrent mechanism for minimizing or eliminating the loss of electronic devices due to theft, wherein the electronic devices comprises at least one input-output (I/O) connection; said theft-deterrent mechanism comprising:

a printed circuit board (PCB) with a first set of and a second set of terminals; wherein the first set of the terminals are electronically coupled with the leads of the at least one I/O connection of an electronic device; wherein the electronic device has at least one locking code accessible via the at least I/O connection; and wherein the second set of the terminals are electronically coupled with a reader that can de-lock the at least one locking code; thereby the electronic device has to be activated by the reader before use.

2. The theft-deterrent mechanism of claim 1, wherein the electronic devices are flash memory cards, CF form factor ATA hard drive, USB flash memory drives, and MP3 players.

3. The theft-deterrent mechanism of claim 1, wherein the first set of terminals is flexible to accommodate all I/O connections.

4. The theft-deterrent mechanism of claim 1, wherein the at least one locking code is pre-stored within the electronic device during manufacturing process.

5. The theft-deterrent mechanism of claim 1, wherein the at least locking code is input into the electronic device by the I/O connection via the first set of terminals of the PCB.

6. The theft-deterrent mechanism of claim 1, wherein the reader is installed at the sales counters so that the electronic devices are activated at the point of sale (POS).

7. A retail package of an electronic device with a theft-deterrent mechanism, comprising:

an electronic device comprising an input-output (I/O) connection;

a theft-deterrent mechanism for minimizing or eliminating the loss of electronic devices due to theft; said theft-deterrent mechanism comprising:

a printed circuit board (PCB) with a first set of and a second set of terminals; wherein the first set of the terminals are electronically coupled with the leads of the at least one I/O connection of an electronic device; wherein the electronic device has at least one locking code accessible via the at least I/O connection; and wherein the second set of the terminals are electronically coupled with a reader that can de-lock the at least one locking code; thereby the electronic device has to be activated by the reader before use; and a packaging for encasing the electronic device and the theft-deterrent mechanism but leaving the second set of terminals of the PCB outside of the packaging so that the second set of terminals can be accessed by the reader without opening the packaging.

8. The retail package of claim 7, wherein the electronic devices are flash memory cards, CF form factor ATA hard drive, USB flash memory drives, and MP3 players.

9. The retail package of claim 7, wherein the first set of terminals is flexible to accommodate all I/O connections.

10. The retail package of claim 7, wherein the at least one locking code is pre-stored within the electronic device during manufacturing process.

11. The retail package of claim 7, wherein the at least locking code is input into the electronic device by the I/O connection via the first set of terminals of the PCB.

12. The retail package of claim 7, wherein the reader is installed at the sales counters so that the electronic devices are activated at the point of sale (POS).

13. The retail package of claim 7, wherein the packaging is made of materials selected from a group consisting of: plastics, papers, and metal sheets.

14. A method for minimizing and eliminating the loss of electronic devices due to theft, wherein the electronic devices have at least one input-output (I/O) connection, said method comprising:

de-activating the electronic devices by providing at least one locking code to the electronic devices so that the electronic devices cannot be used without activation; and activating the electronic devices by de-locking the at least one locking code within the electronic devices via the I/O connections;

wherein the activating step employs a printed circuit board (PCB) with a first set of and a second set of terminals; wherein the first set of the terminals are electronically coupled with the leads of the at least one I/O connection of an electronic device; and wherein the second set of the terminals are electronically coupled with a reader that can de-lock the at least one locking code.

15. The method of claim 14, wherein the electronic devices are flash memory cards, CF form factor ATA hard drive, USB flash memory drives, and MP3 players.

16. The method of claim 14, wherein the first set of terminals is flexible to accommodate all I/O connections.

17. The method of claim 14, wherein the at least one locking code is pre-stored within the electronic device during manufacturing process.

18. The method of claim 14, wherein the at least locking code is input into the electronic device by the I/O connection via the first set of terminals of the PCB.

19. The method of claim 14, wherein the reader is installed at the sales counters so that the electronic devices are activated at the point of sale (POS).

* * * * *